March 25, 1930. R. L. FRINK 1,751,987
METHOD AND APPARATUS FOR MELTING GLASS AND THE LIKE
Filed Oct. 8, 1926 3 Sheets-Sheet 1

INVENTOR
Robert L. Frink

March 25, 1930. R. L. FRINK 1,751,987
METHOD AND APPARATUS FOR MELTING GLASS AND THE LIKE
Filed Oct. 8, 1926 3 Sheets-Sheet 2

March 25, 1930. R. L. FRINK 1,751,987
METHOD AND APPARATUS FOR MELTING GLASS AND THE LIKE
Filed Oct. 8, 1926 3 Sheets-Sheet 3

INVENTOR
Robert L. Frink
by Byrnes Stebbins & Parmelee
his attys

Patented Mar. 25, 1930

1,751,987

UNITED STATES PATENT OFFICE

ROBERT L. FRINK, OF LANCASTER, OHIO

METHOD AND APPARATUS FOR MELTING GLASS AND THE LIKE

Application filed October 8, 1926. Serial No. 140,273.

This invention relates to the melting of glass and the like, and may be employed in the manufacture of enamels, glazes, frits and other products of a glass-like character.

Where only small quantities of glass are to be melted, clay pots are generally employed for holding the materials. When a larger quantity of glass is needed, the so-called "day tanks" are used and, for continuous or semi-continuous operation, larger tanks are used in which the material to be melted is supplied at one end and the molten glass is taken off at the other end.

In any case, the materials have been charged into a receptacle containing some quantity of molten glass on which the constituent materials float as they are melted down. The heat acts only on the surface of the constituent materials and chemical reaction can occur only as fast as the heat can be conducted into the mass. The gases evolved during the reaction can escape only at a limited rate and with glass of certain compositions the escape of the gases is retarded to such an extent that an extended fining step must be resorted to if seeds or bubbles are to be avoided.

I provide a refractory support adapted to receive constituent material and subject such material to a melting temperature as it moves over this support. Preferably the support is inclined so that the material moves thereover by gravity during the melting step. This insures better melting, since the constituent material is in a thin and spread-out condition and therefore, in the main, is subjected directly to the melting heat. In melting operations as heretofore practiced the material was in the form of a relatively deep mass having only a small amount of surface exposed to the heat. When the material is spread out over the refractory support the evolved gases may pass out far more freely than in ordinary melting apparatus. The heat efficiency is also higher than in pot or tank furnaces.

Preferably, the melted material is collected in a pool which constitutes a storage chamber. The glass must be cooled to a certain extent before it can be worked, and the cooling is effected by radiation. I provide means for regulating the cooling effect. Preferably the pool increases in cross-sectional area from the point where molten glass flows into it from the refractory support to the point where the glass is taken off for use.

Baffles are preferably employed between these points to prevent stones and the like from reaching the point where the glass is taken off.

In the accompanying drawings, which illustrate the present preferred embodiment of the invention—

Figure 1:
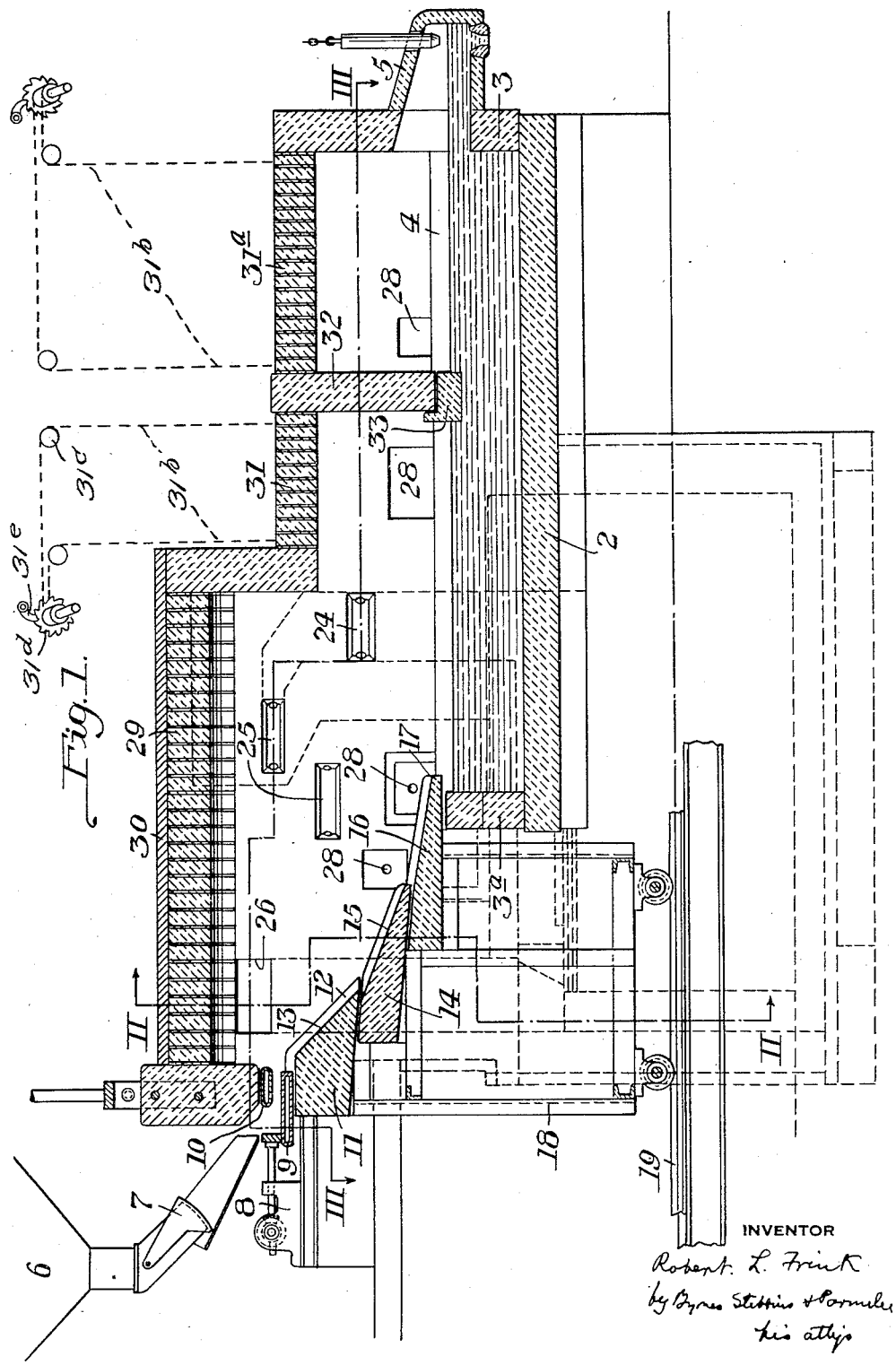
Figure 1 is a vertical longitudinal section through a furnace embodying the invention.
Figure 2:
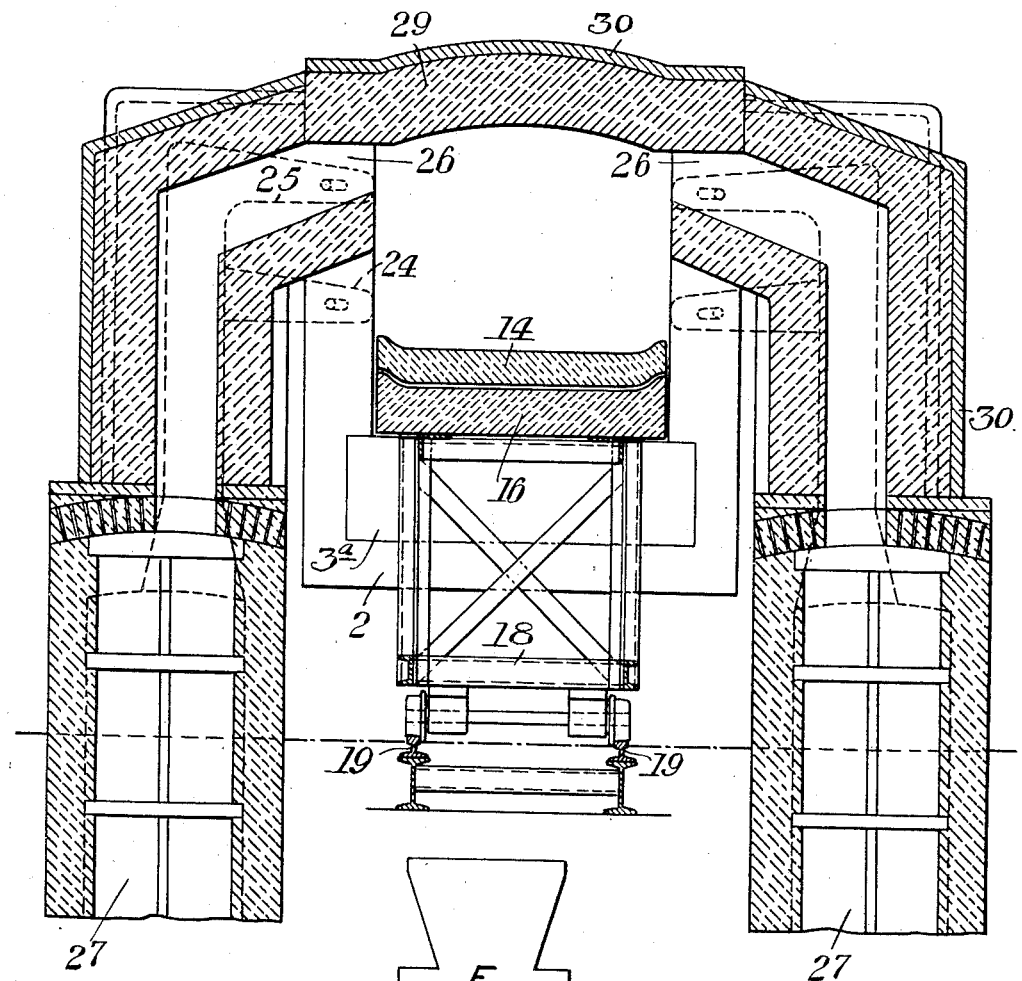
Figure 2 is a cross-section to enlarged scale taken on the line II—II of Figure 1.

In the illustrated embodiment of the invention there is shown a melting furnace comprising a bottom 2, an end wall 3 and side walls 4. The side walls extend for a distance in substantially parallel relationship and then diverge as they approach the end wall 3. The side walls extend a greater distance than does the bottom 2 which is cut short and provided with an end wall 3ª so as to form a chamber for a pool of molten glass. The glass is taken off at one or more points adjacent the end wall 3. In the drawings I have shown a plurality of feeder boots 5 through which the molten glass is discharged.

The constituent materials, which may comprise cullet as well as the basic constituents of the glass, are supplied from a bin 6 through a cut-off gate 7 to a feeder indicated generally by the reference character 8. This feeder is designed so as to supply the materials in a substantially continuous manner. In other words, instead of pushing in large batches of material at relatively widely spaced apart time intervals, the feeder is operated in such manner as to supply small lots of material very close together. For instance, I have employed in actual practice a pusher which on each operation causes a two inch forward movement of a mass of constituent material sixty inches wide by three inches deep, such movement occurring every seven and one-half seconds.

As the material is fed into the furnace it is supported on a water-cooled plate 9, and the thickness of the entering stream of material is limited by a water-cooled plate 10 under which all entering material must pass.

As the constituent material is pushed off the end of the plate 9 it falls onto the surface of a refractory block 11 which is made of a material having a low co-efficient of expansion, such as sillimanite, or refractories made from compounds of sillimanite, rare earths, with a glass-like bond, as described and claimed in my copending application, Serial No. 136,383, filed September 18, 1926. This block has upstanding sides 12 so as to prevent material from spilling off the sides. Its working surface 13 is inclined at an angle of about 45 degrees and the constituent material moves thereover by gravity.

During this movement it is subjected to a melting temperature. The block 11 overlaps a block 14 which is of similar construction but whose working face 15 is at a flatter angle. The block 14 in turn overlaps a block 16 having a still flatter supporting face. The three blocks taken together constitute a chute of varying inclination for constituent materials. As the material moves along the chute it is reduced to glass and therefore moves more freely. On this account it is important to reduce the angle near the discharge end 17 of the chute. The precise angle at the other end is not so important as the materials will be forced along the chute for a certian distance by materials supplied later in point of time even though the chute is substantially flat or even inclined upwardly.

The blocks 11, 14 and 16 are mounted on a wheeled truck 18 which runs on tracks 19. It will be noted that the block 16 projects beyond the truck so that the discharge end 17 overhangs the end wall 3ª. The truck 18 is so designed that it is bodily removable from the furnace if occasion demands. If one of the blocks becomes cracked the truck may be pulled out and a new one inserted in a very short time. This feature is of considerable value as only a very small amount of erosion will occur in the walls surrounding the molten pool of glass, and with the truck 18 permitting complete replacement of the melting trough in a short period of time, the furnace may be operated indefinitely with stops of only a few minutes duration, at widely spaced apart intervals, for changing trucks 18.

Figure 4:
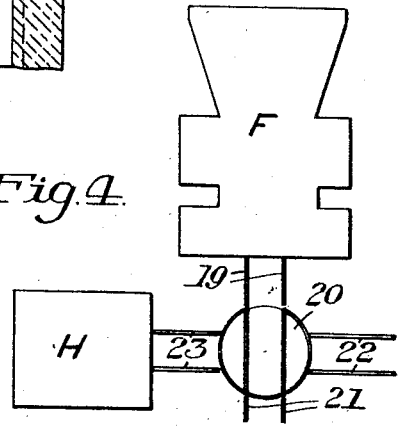
Figure 4 is a top plan view of a furnace and associated heating chamber.
Figure 3:
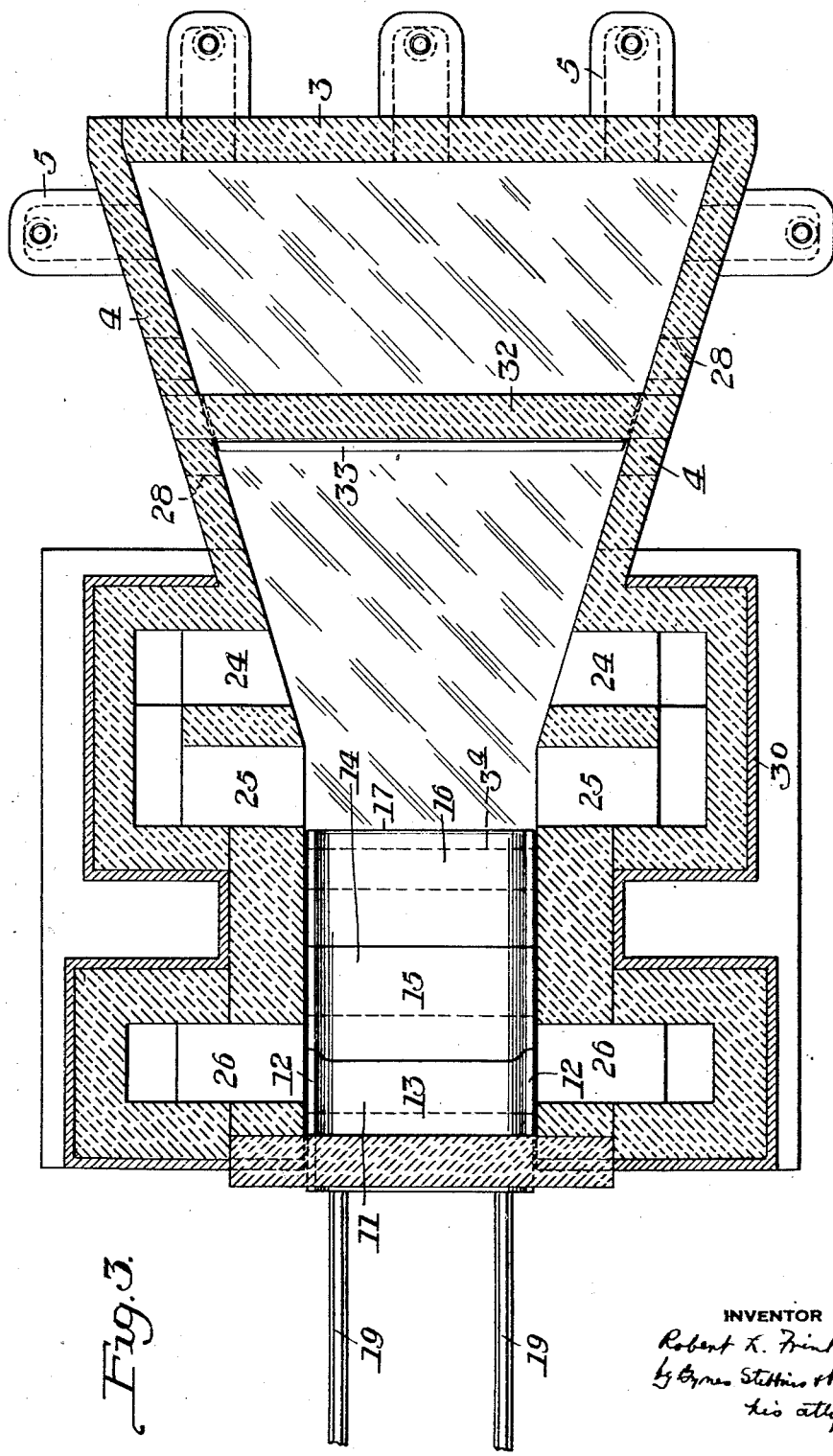
Figure 3 is a horizontal section taken on the line III—III of Figure 1.

A preferred arrangement of tracks for handling the trucks 18 is shown in Figure 4. The furnace is indicated at F. The tracks 19 extend from the rear thereof to a turntable 20 from which extend tracks 21, 22 and 23. The tracks 23 lead to a heating furnace H in which a spare truck 18 having new trough blocks thereon is kept at high temperature and ready for immediate use. If it is desired to replace the melting blocks in the furnace the truck 18 is pulled out to the turntable 20 and taken out of the way by utilizing the tracks 21 and 22. The truck which is in the heating furnace H is then pulled out on the track 23 to the turntable 20 and is thus placed on the tracks 19 and pushed into place. An operation of this kind may be carried out in a very few minutes, whereas in tank furnaces as now constructed the replacement of eroded tank blocks requires cooling of the furnace, lowering of the glass level therein and a very large amount of hand labor under adverse conditions, all of this requiring a day or more.

The melting end of the furnace is supplied with a recuperative heating system. Entering combustibles are supplied through ports 24 and 25, while burned gases are taken off through ports 26. These ports are connected to recuperators 27 of any desired construction. Openings 28 are provided for viewing the melting operation. Every effort is made to conserve heat in the melting end of the furnace, and to this end the arch 29 is covered with a heat insulating material 30. The walls are similarly covered.

As above stated, the molten glass is collected in a pool which increases in cross-sectional area from the melting end to the end where the glass is used. This construction causes a decrease in the rate of flow of the glass as it moves away from the melting end, thereby permitting settling to occur. This construction also provides a constantly increasing tendency toward loss of heat by radiation and convection. The glass is thus cooled down to a proper working temperature. The amount of cooling may be controlled to some extent by providing movable arches 31. By moving the arch toward or away from the body of molten glass the rate of cooling may be varied as desired. Obviously, the side walls above the molten glass may be arranged for a similar adjustment if desired.

A hanging mantle 32 extends across the furnace near the working end. It terminates a short distance above the surface of the molten glass. Beneath it there is placed a floater block 33 under which the glass must pass on its way to the working end. The space lying to the right of the mantle 32, as viewed in the drawings, constitutes a working chamber from which the glass is taken off as desired. No special heating is provided for the working chamber, although it will of course be maintained at elevated temperature by reason of heat conduction from the melting chamber and also by reason of the molten glass flowing thereinto. Its temperature may be regulated as, for instance, by adjusting the position of its top arch 31ª.

I have illustrated diagrammaticaly in Figure 1 one method of controlling the top arches 31 and 31ª. Each arch is provided with supporting chains 31ᵇ running over sheaves 31ᶜ to a windlass 31ᵈ. These reels are of usual construction, being provided with a pawl and ratchet mechanism 31ᵉ, whereby the arches may be held in any desired elevated position.

The refractory blocks which support the constituent material may be made of various materials, but it is preferred to use refractories having a low coefficient of expansion, as this permits of moving the trucks 18 into or out of the furnace without injury due to the sudden temperature change. The blocks will preferably have their working faces inclined in such amount that the material moves thereover with substantially uniform velocity.

I have illustrated and described a preferred embodiment of the invention, but it will be understood that it is not limited to the form shown as it may be otherwise embodied and practiced within the scope of the following claims.

I claim:

1. The method of making molten materials which includes substantially continuously charging the material upon a refractory support in a relatively thin and spread out condition, subjecting such materials to a melting temperature, and substantially continuously advancing the materials during the melting step at a substantially uniform rate at all points of travel.

2. The method of making molten glass-like material which includes subjecting constituent material to a melting temperature while maintaining it in a relatively thin and spread out condition, substantially continuously advancing the material during the melting step at a substantially uniform rate at all points of travel, and collecting the melted material in a pool.

3. The method of making molten glass-like material which includes subjecting constituent material to a melting temperature while maintaining it in a relatively thin and spread out condition, collecting the melted material in a pool, and controlling the temperature of the molten material in the pool by regulating the rate of heat dissipation.

4. Apparatus for making molten glass-like material including a relatively shallow refractory support adapted to receive constituent material and having different portions extending the same direction but disposed at varying angles, and means for supplying heating gases to the material on the support.

5. Apparatus for making molten glass-like material including a refractory support adapted to receive constituent material, the support being made of sections having supporting faces extending in the same direction but disposed at varying angles, and means for supplying heating gases to the material on the support.

6. Apparatus for making molten glass-like material including a refractory support adapted to receive constituent material and means for melting material on the support, the support being inclined so that the melting material moves thereover, the inclination of the support gradually decreasing at the discharge end.

7. Apparatus for making molten glass-like material including a relatively shallow refractory support adapted to receive constituent material, means for melting material on the support, and a receiver for the molten glass, the support and the receiver lying in a furnace enclosure, the support being mounted on a supporting carriage so as to be bodily removable therefrom.

8. Apparatus for making molten glass-like material including a relatively shallow refractory support adapted to receive constituent material, means for melting material on the support, and a receiver for the molten glass, the support and the receiver lying in a furnace enclosure, the support being mounted on a supporting carriage so as to be bodily removable therefrom, the support being made of a material adapted to withstand sudden temperature changes.

9. Apparatus for making molten glass-like material including a refractory support adapted to receive constituent material, means for melting material on the support, and a receiver for the molten glass, the receiver having means for varying the cooling rate of molten material therein.

10. Apparatus for making molten glass-like material including a refractory support adapted to receive constituent material, means for melting material on the support, and a receiver for the molten glass, the receiver having an enclosure portion such as a wall or roof portion adjustable toward and away from the glass.

11. Apparatus for making molten glass-like material including a refractory support adapted to receive constituent material, means for melting material on the support, and a receiver for the molten glass, the receiver and the support lying in a furnace enclosure, a portion of said furnace enclosure containing the support and a portion only of the receiver, said portion being well insulated, the remaining portion of the furnace enclosure being less perfectly insulated and constituting a working chamber.

12. Apparatus for making molten glass-like material, including a refractory support with a portion adapted to receive constituent materials and another inclined portion over which the material may pass while in process of melting, the last mentioned portion being inclined and of a substantially continuous character, the inclination of such portion progressively varying in different portions thereof.

13. Apparatus for making molten glass-like material, including a refractory support with a portion adapted to receive constituent materials and another inclined portion over which the material may pass while in process of melting, the last mentioned portion being inclined, the inclination of such portion progressively decreasing toward the lower end.

14. Apparatus for making molten glass-like material, including a refractory support with a portion adapted to receive constituent material, and another inclined portion over which the material may pass while in process of melting, the last mentioned portion being inclined and of a substantially continuous character, the inclination of such portion varying in different parts thereof, and combustion means arranged to cause direct contact of material on the last mentioned portion with the hot combustion gases.

15. Apparatus for making molten glass-like material including a refractory support with a portion adapted to receive constituent materials and another inclined portion over which the material may pass while in process of melting, the last mentioned portion being inclined and of a substantially continuous character, the last mentioned portion being made up of blocks in over-lapping relationship, different blocks having their faces inclined in different amounts.

16. The method of melting glass-like material, which includes supplying the constituent material to an inclined refractory support, and subjecting it to a melting temperature, the material being supplied at such rate and the support being so inclined that substantially no piled up material resides on the inclined refractory support adjacent the point where material is supplied, whereby the material is melted down and flows over the refractory support in a thin and spread-out condition at substantially all times.

In testimony whereof I have hereunto set my hand.

ROBERT L. FRINK.